(12) United States Patent
Axtman et al.

(10) Patent No.: US 8,044,816 B2
(45) Date of Patent: Oct. 25, 2011

(54) APPARATUS, SYSTEM, AND METHOD FOR DETECTING THE FORMATION OF A SHORT BETWEEN A MAGNETORESISTIVE HEAD AND A HEAD SUBSTRATE

(75) Inventors: Brian Axtman, Tucson, AZ (US); Robert Glenn Biskeborn, Hollister, CA (US); Stanley W. Czarnecki, Palo Alto, CA (US); Larry LeeRoy Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/670,406

(22) Filed: Feb. 1, 2007

(65) Prior Publication Data

US 2008/0186634 A1   Aug. 7, 2008

(51) Int. Cl.
*G08B 21/00* (2006.01)
*G11C 19/08* (2006.01)
*G11C 11/34* (2006.01)
*G11C 7/10* (2006.01)
*G11C 7/00* (2006.01)
*G11C 7/02* (2006.01)

(52) U.S. Cl. .. 340/650; 365/8; 365/185.24; 365/189.04; 365/196; 365/210.12

(58) Field of Classification Search ............... 360/66, 360/25
See application file for complete search history.

(56) References Cited

U.S. PATENT DOCUMENTS

| | | | | |
|---|---|---|---|---|
| 4,631,615 A | * | 12/1986 | Grossman et al. | 360/128 |
| 4,875,125 A | * | 10/1989 | Joannou et al. | 360/128 |
| 4,933,781 A | * | 6/1990 | Nishimura et al. | 360/18 |
| 5,329,413 A | * | 7/1994 | Kondoh et al. | 360/327.32 |
| 5,780,176 A | * | 7/1998 | Iwasaki et al. | 428/811.2 |
| 6,104,199 A | | 8/2000 | Sako | 324/546 |
| 6,225,802 B1 | | 5/2001 | Ramalho et al. | 324/252 |
| 6,349,007 B1 | | 2/2002 | Jiang | 360/31 |
| 6,512,367 B2 | | 1/2003 | Liu et al. | 324/210 |
| 6,687,064 B1 | | 2/2004 | Jiang et al. | 360/31 |
| 6,762,914 B2 | | 7/2004 | Fox et al. | 360/313 |
| 6,775,078 B2 | | 8/2004 | Jiang | 360/46 |
| 2003/0053239 A1 | * | 3/2003 | Jiang | 360/66 |
| 2007/0133130 A1 | * | 6/2007 | Biskeborn | 360/323 |

* cited by examiner

*Primary Examiner* — Daniel Wu
*Assistant Examiner* — Pameshanand Mahase
(74) *Attorney, Agent, or Firm* — Kunzler Needham Massey & Thorpe

(57) ABSTRACT

An apparatus, system, and method are disclosed for detecting the formation of a short between a magnetoresistive ("MR") head and a head substrate. The apparatus is presented with a logic unit containing a plurality of modules configured to functionally execute the necessary steps of generating a baseline electric potential level between a head substrate and ground, monitoring the level of the electric potential between the head substrate and ground, and detecting the formation of a short circuit between the MR head and the head substrate by detecting a change in the electric potential level monitored by the monitoring module from the baseline level to a predetermined threshold level. Beneficially, such an apparatus, system, and method would reduce read errors on the magnetic tape storage system, the time and resources required to recover from such errors, and allow for preventative measures to obviate contamination short related failures of tape drive systems.

20 Claims, 7 Drawing Sheets

APPARATUS, SYSTEM, AND METHOD FOR DETECTING THE FORMATION OF A SHORT BETWEEN A MAGNETORESISTIVE HEAD AND A HEAD SUBSTRATE

BACKGROUND OF THE INVENTION

1. Field of the Invention

This invention relates to magnetic tape drives and more particularly relates to detecting the formation of a short between a magnetoresistive ("MR") head and a head substrate.

2. Description of the Related Art

Prior to the advent of automation technology for linear tape drives, large, open tape reels were manually loaded by operators of tape storage systems. As advances in tape cassette and other technologies were adapted to magnetic tapes drives, large automated tape systems became possible. In such a system, magnetic tape cassettes are automatically selected from a library of tape cassettes, and loaded to and unloaded from magnetic tape drives by a robotic arm or other similar automation technology.

The use of tape cassettes coincided with the introduction of magnetoresistive (MR) thin film heads, which are fabricated using processes similar to those used for hard disk drive heads. Both tape and hard disk drive heads are fabricated on ceramic wafer substrates. The preferred wafer material is aluminum oxide-titanium carbide, which is very hard and also happens to be electrically conductive. In a tape drive, tape contacts the conductive substrate. To avoid adverse tribological process, the substrate may be biased to a preferred voltage level, generally between 0 and 3 volts. Debris from the tape or the environment may collect on the head and electrically bridge the insulation gap between the conductive wafer substrate and the MR heads. The resulting shorting can disrupt the flow of bias current in the MR heads, which is necessary for their proper functioning. The shorting can also disrupt the substrate voltage biasing, leading to further degradation on the surface of the head.

Thus, debris or contamination of the MR heads may result in a short circuit between the MR head element and the head substrate. A typical short will result in increased read errors, or complete failure to read data to the tape. Because of the rubbing of tape on the heads, shorting related errors are generally more likely to occur in tape drives than in hard disk drives and other types of data storage devices.

Current magnetic tape storage systems do not provide a proactive method for identifying substrate-sensor related shorts. Typically, the formation of the short goes unnoticed until either read error rates become excessive or the tape drive fails to read data. Substrate-sensor shorts may be correctable at the time of discovery, but the required head cleaning process is often time consuming and disruptive to normal operation of the tape drive system.

For example, in an automated tape drive system, a short may be detected by an increased error rate while writing data to a tape cassette. In such an example, the automated system must dedicate resources to remove the magnetic tape cassette from the tape drive, insert a head cleaning cassette, allow the cleaning cassette to clean the MR heads, remove the head cleaning cassette, and replace the magnetic tape cassette. This process is often repeated until data can be accurately read or written to the tape.

As a consequence of the cumbersome head cleaning process, data reliability can be negatively impacted, time and system resources are wasted, and system down time is not efficiently used. It would be useful to provide a solution for early detection of shorts between MR heads and the head substrate. Such a solution would reduce error rates, increase efficiency, and better utilize system down time.

From the foregoing discussion, it should be apparent that a need exists for an apparatus, system, and method for detecting the formation of a short between a MR head and a head substrate. Beneficially, such an apparatus, system, and method would reduce read errors on the magnetic tape storage system, the time and resources required to recover from such errors, and allow for preventative measures to obviate short related failures of tape drive systems.

SUMMARY OF THE INVENTION

The present invention has been developed in response to the present state of the art, and in particular, in response to the problems and needs in the art that have not yet been fully solved by currently available magnetic tape drive systems. Accordingly, the present invention has been developed to provide an apparatus, system, and method for detecting the formation of a short between a magnetoresistive head and a head substrate that overcome many or all of the above-discussed shortcomings in the art.

The apparatus for detecting the formation of a short between a magnetoresistive ("MR") head and a conductive head substrate is provided with a logic unit containing a plurality of modules configured to functionally execute the necessary steps of generating a baseline electric potential level between a head substrate and ground, monitoring the level of the electric potential between the head substrate and ground, and detecting the formation of a short circuit between the MR head and the head substrate by detecting a change in the electric potential level monitored by the monitoring module from the baseline level to a predetermined threshold level. These modules in the described embodiments include a biasing module, a monitoring module, and a detection module.

In one embodiment, the biasing module further comprises a substrate biasing module and a head biasing module. The substrate biasing module may comprises a voltage divider circuit configured to generate a predetermined baseline electric potential level. In such an embodiment, a short between the head and substrate appears as a parallel resistance across the substrate voltage divider circuit. The parallel combination is obviously less than the substrate voltage divider resistance and so may result in a reduction of the substrate bias voltage.

The detection module may detect a short circuit between the MR head and the head substrate by detecting a change in electric potential level between the head substrate and ground resulting from the change in resistance between the head substrate and ground. In a further embodiment, the detection module checks the electric potential level monitored by the monitoring module when a tape cassette is ejected.

In one embodiment, the apparatus further comprises a cleaning module configured to manage head cleaning in response to the detection module detecting a short circuit. Additionally, the apparatus may comprise a notification module configured to notify a tape drive user when a short circuit is detected.

A system of the present invention is also presented for detecting the formation of a short between a magnetoresistive head and a head substrate. In one embodiment, the system includes a magnetic tape cassette configured to store data on a magnetic tape. The system may additionally include a magnetic tape drive configured to generate a baseline electric potential level between a head substrate and ground, monitor the level of the electric potential between the head substrate and ground, and detect the formation of a short circuit between the MR head and the head substrate by detecting a change in the electric potential level monitored by the monitoring module from the baseline level to a predetermined threshold level. Additionally, the system may include a head cleaning device configured to clean the MR head and head substrate on the magnetic tape drive.

The system may be further configured to automatically clean the heads on the magnetic tape drive with the head cleaning device in response to detection of a short circuit between the MR head and the head substrate. In another embodiment, the magnetic tape drive may be further configured to notify a tape drive user to load the head cleaning device when a short circuit is detected.

A method of the present invention is also presented for detecting the formation of a short between a magnetoresistive head and a head substrate. The method in the disclosed embodiments substantially includes the steps necessary to carry out the functions presented above with respect to the operation of the described apparatus and system. In one embodiment, the method includes generating a baseline electric potential level between a head substrate and ground, monitoring the level of the electric potential between the head substrate and ground, and detecting the formation of a short circuit between the MR head and the head substrate by detecting a change in the electric potential level monitored by the monitoring module from the baseline level to a predetermined threshold level.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
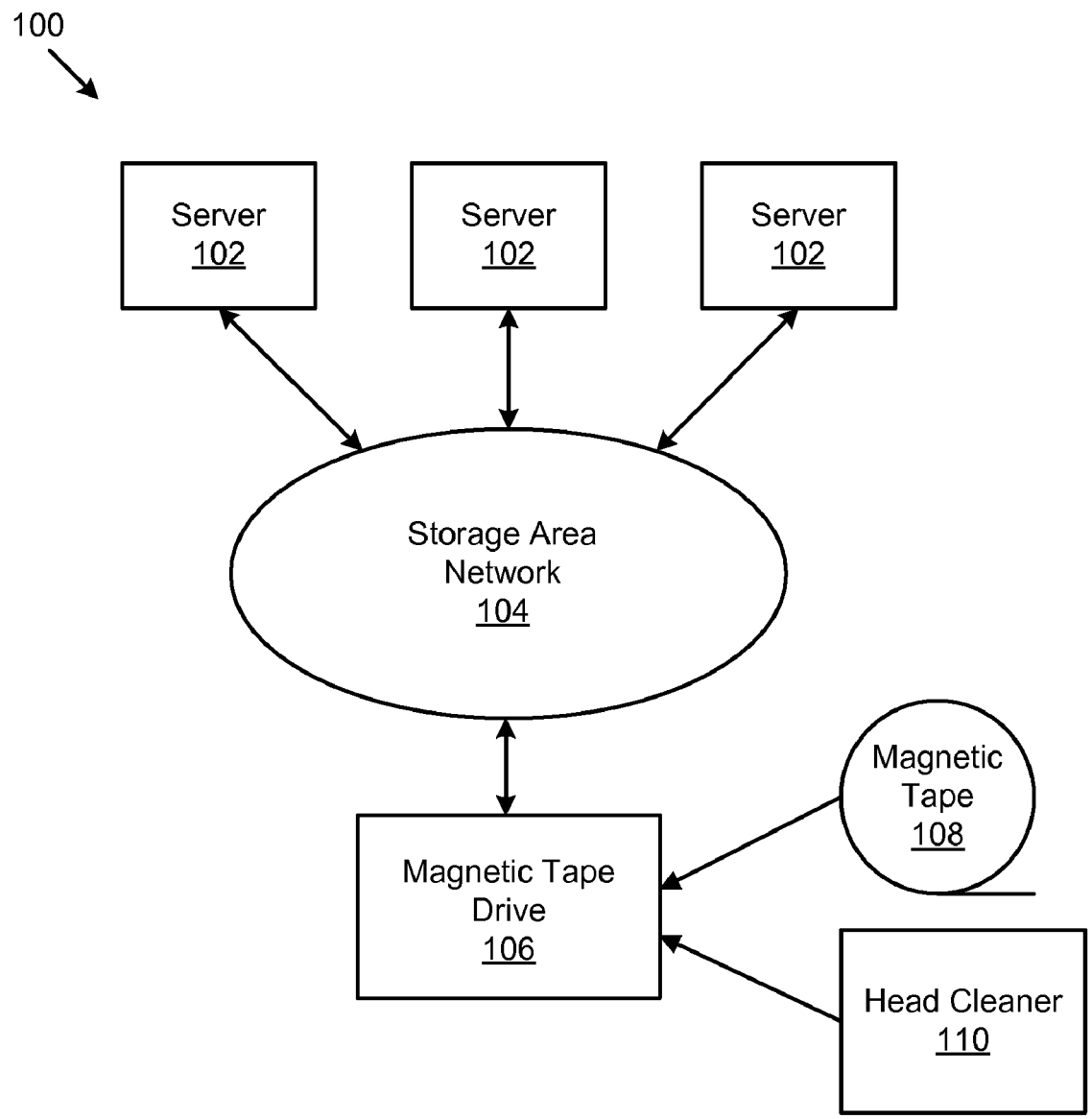
FIG. 1 is a schematic block diagram illustrating one embodiment of a system for detecting the formation of a short between a magnetoresistive ("MR") head and a head substrate in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a system 100 for detecting the formation of a short between a magnetoresistive head and a head substrate. In one embodiment, the system 100 includes one or more servers 102 connected to a Storage Area Network ("SAN") 104. The system 100 also includes a magnetic tape drive 106 connected to the SAN 104. The system may additionally include one or more magnetic tape cassettes 108 and a head cleaning device 110.

In one embodiment, the server 102 is an application or web server. Alternatively, the server 102 may be a data storage server. In certain embodiments, the server 102 may store data on the magnetic tape cassette 108 using the magnetic tape drive 106. Data may be stored on the magnetic tape cassette 108 as a backup copy of the data stored on a data storage server 102.

The storage area network 104 may comprise a network or fabric of data switches, routers, storage devices, and the like. The SAN may employ a variety of networking protocols for data communication, including Transmission Control Protocol ("TCP"), fibre channel, Small Computer System Interface ("SCSI"), and the like. The SAN 104 may be primarily used for trafficking of data for storage on one or more storage devices. In one embodiment, the SAN 104 may traffic backup data between a server 102 and the magnetic tape drive 106.

In one embodiment, the magnetic tape drive 106 is configured to generate a baseline electric potential level between a head substrate and ground, monitor the level of the electric potential between the head substrate and ground, and detect the formation of a short circuit between the MR head and the head substrate by detecting a change in the electric potential level monitored by the monitoring module from the baseline level to a predetermined threshold level. The magnetic tape drive 106 may be further configured to manage data read/write operations for storing data on a magnetic tape cassette 108. In certain embodiments, the magnetic tape drive 106 may include read/write heads. These heads and associated head substrate are discussed in greater detail with reference to FIG. 4 below. In one embodiment, the magnetic tape drive 106 is an International Business Machines ("IBM") TotalStorage™ second generation model 3592 tape storage system.

In one embodiment, the magnetic tape cassette 108 includes a protective case, one or more tape spools, tape guides, and the like. In one embodiment, the magnetic tape cassette 108 is a half inch tape cartridge for use with a model 3592 tape drive 106. The tape cassette 108 may additionally include writable magnetic tape. The tape guides may position the tape in close proximity to the MR heads of the magnetic tape drive 106.

In one embodiment, the head cleaning device 110 is configured to clear the MR heads and head substrate of contaminants. The cleaning device 110 may include brushes, pressurized air, chemical cleaners, and the like. In one embodiment, the cleaning device 110 is an external cartridge that is inserted into the magnetic tape drive 106. Alternatively, the cleaning device 110 may comprise a brush system, or other cleaning system, stored and operated internally within the magnetic tape drive 106.

Figure 2:
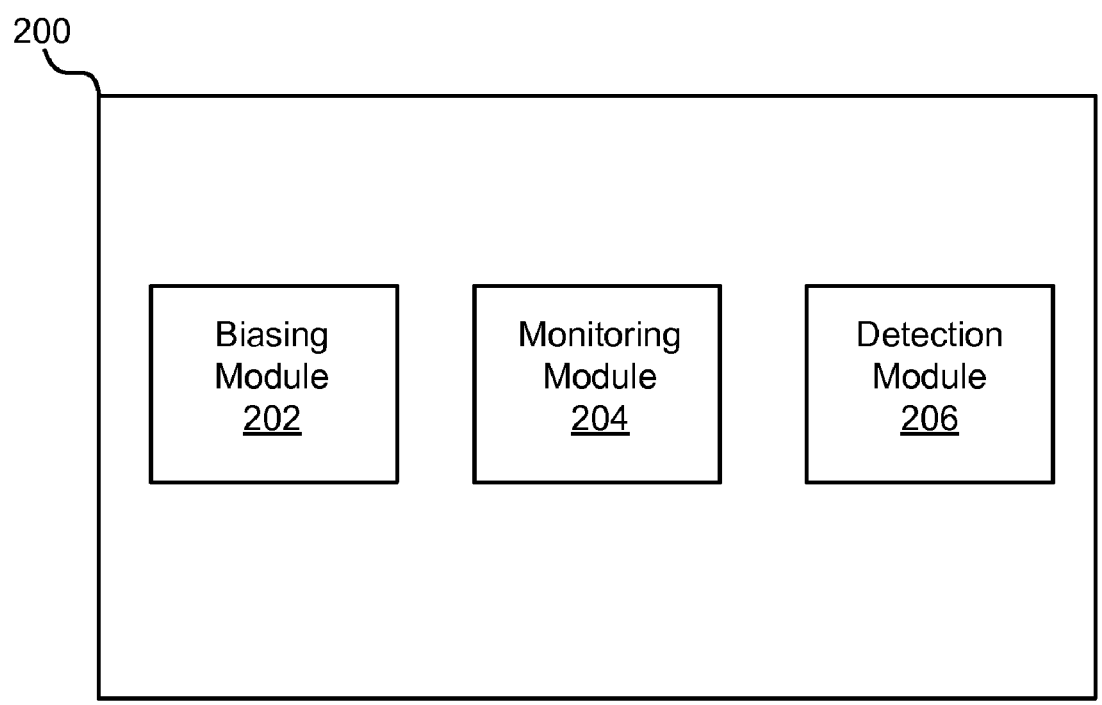
FIG. 2 is a schematic block diagram illustrating one embodiment of an apparatus for detecting the formation of a short between a MR head and a head substrate.

FIG. 2 illustrates one embodiment of an apparatus 200 for detecting the formation of a short between a MR head and a head substrate is provided with a logic unit containing a plurality of modules configured to functionally execute the necessary steps of generating an electric potential difference between an MR head and a head substrate, monitoring the level of the electric potential difference between the MR head and the head substrate, and detecting the formation of a short circuit between the MR head and the head substrate by detecting a drop in the electric potential difference monitored by the monitoring module to a predetermined threshold level. These modules include a biasing module 202, a monitoring module 204, and a detection module 206.

In one embodiment, the biasing module 202 comprises a series of electronic circuit components necessary to generate, regulate, and maintain a bias voltage on the head substrate and the MR heads. In such an embodiment, the biasing module may generate a baseline electric potential level between the head substrate and ground. In one embodiment, the biasing module 202 may comprise separate circuits for biasing the MR heads and the head substrate. For example, the MR heads may be substantially grounded, or biased to 0 Volts, and the head substrate may be biased to 1.5 Volts. Alternatively, the head substrate may be biased to from 1 to 5 volts. In another alternative embodiment, the head substrate may be biased to 0 Volts, or grounded, and the MR heads may be biased to a negative potential level. In certain embodiments, the bias module 202 may comprise programmable or adjustable voltage and current sources. One particular embodiment of the bias module 202 is discussed in greater detail with respect to FIG. 5.

In one embodiment, the monitoring module 204 comprises a volt meter connected between the head substrate and ground. The monitoring module 204 may be internal to the magnetic tape drive 106. Alternatively, the monitoring module 204 may be connected to access pads, but external to the magnetic tape drive 106. The monitoring module 204 may continuously monitor the potential difference between the head substrate and ground. Alternatively, the monitoring module 204 may monitor the potential difference when triggered or initiated by the detection module 206 or a user.

In one embodiment, the detection module 206 is configured to detect the formation of a short circuit between the MR head and the head substrate by detecting a change in the electric potential level monitored by the monitoring module 204 from the baseline level to a predetermined threshold level. The value of the predetermined threshold may be about 0.9 Volts. In certain embodiments, a potential difference level of 0.9 Volts indicates an actual short between an MR head and the head substrate. In an alternative embodiment, the threshold may be set to a higher or lower potential difference value to give the user more or less warning that a short is forming. Reasons for the drop in potential difference between the MR heads and the head substrate are discussed further with respect to FIG. 5.

Figure 3:
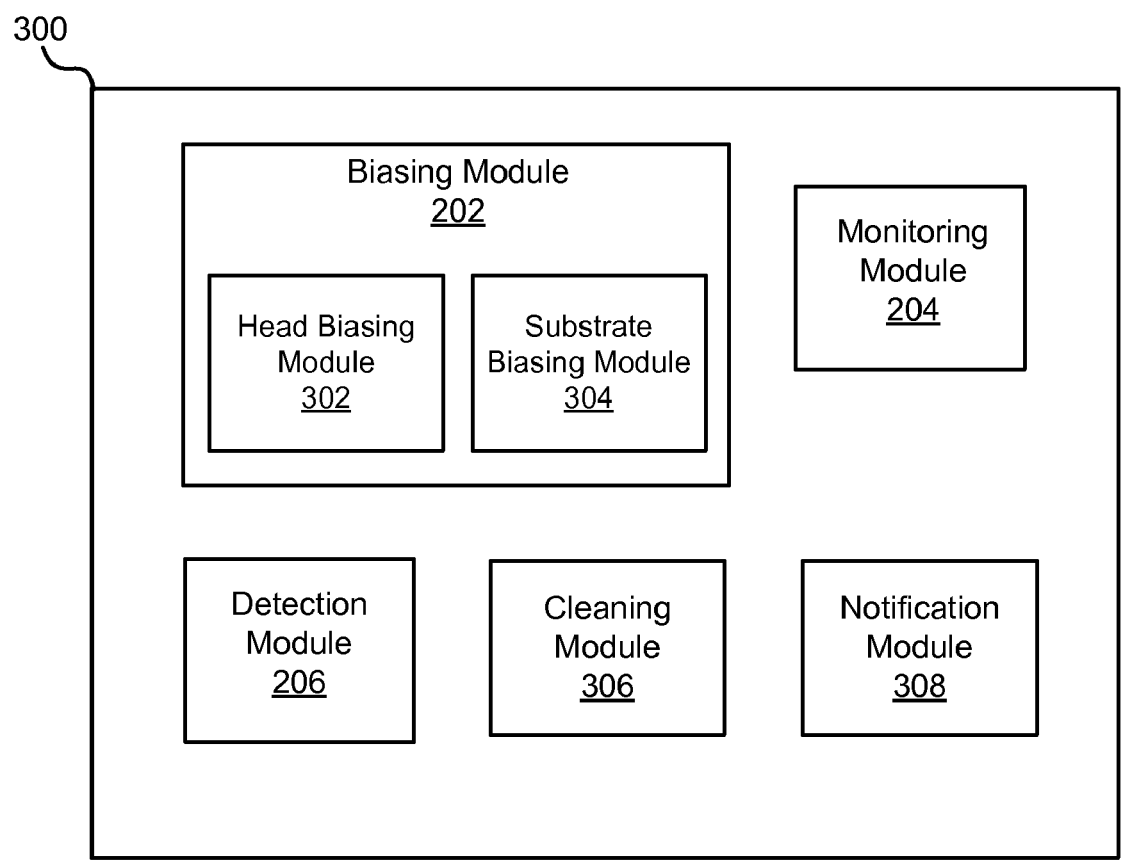
FIG. 3 is a detailed schematic block diagram illustrating one embodiment of an apparatus for detecting the formation of a short between a MR head and a head substrate.

FIG. 3 illustrates another embodiment of an apparatus 300 for detecting the formation of a short between a MR head and a head substrate. In one embodiment, the apparatus 300 includes the biasing module 202, monitoring module 204, and the detection module 206 as described with relation to FIG. 2 above. In one embodiment, the biasing module 202 further comprises a head biasing module 302 and a substrate biasing module 304. Additionally, the apparatus 300 may include a cleaning module 306 and a notification module 308.

In one embodiment, the head biasing module 302 is configured to bias the MR heads. Typically, the head biasing module 302 has a low resistance value with respect to the substrate biasing module 304. In such an embodiment, a short between the MR head and the head substrate basically shunts the substrate biasing circuit to ground through the biasing module resistors, and this is enough to produce an easily detected change in the substrate voltage. In one embodiment, the head biasing module 302 adds under 1 kOhms of resistance to the path between the MR head and ground.

In one embodiment, the substrate biasing module 304 is configured to generate a predetermined baseline electric potential level using a substrate voltage reference resistor. The components of the substrate biasing module 304 are described in further detail with respect to FIG. 5A and FIG. 5B below. In one embodiment, the substrate biasing module 304 has a higher resistance value with respect to the head biasing module 302. In one embodiment, the biasing module 302 adds 35 kOhms of resistance between the head substrate and ground.

In one embodiment, the cleaning module 306 is configured to manage head cleaning in response to detecting a short circuit. For example, in an automated tape drive system, the cleaning module 306 may command an automated tape retrieval device to insert a head cleaning device 110 in the magnetic tape deck with the shorted MR heads. Alternatively, the cleaning module 306 may initiate an internal cleaning procedure using internal cleaning brushes, compressed air, or the like.

In one embodiment, the notification module 308 is configured to notify a user of the tape drive 106 when a short circuit is detected. In a further embodiment, the notification module 308 may notify a user of the tape drive 106 to load the head cleaning device 110 when a short circuit is detected. In certain embodiments, the notification module 308 may display an error message on a user display. Alternatively, the notification module 308 may send a message string, email, page, or other notification to a user. The message may include instructions for cleaning the heads.

In one embodiment, the cleaning module 306 and the notification module 308 may perform the respective operations in response to a short detected when a tape cassette 108 is ejected from the tape drive 106. In such an embodiment, the MR heads and the head substrate may be cleaned prior to insertion of another tape cassette 108. Consequently, disruptions to system operations and read/write operations may be reduced by cleaning the heads offline.

Figure 4:
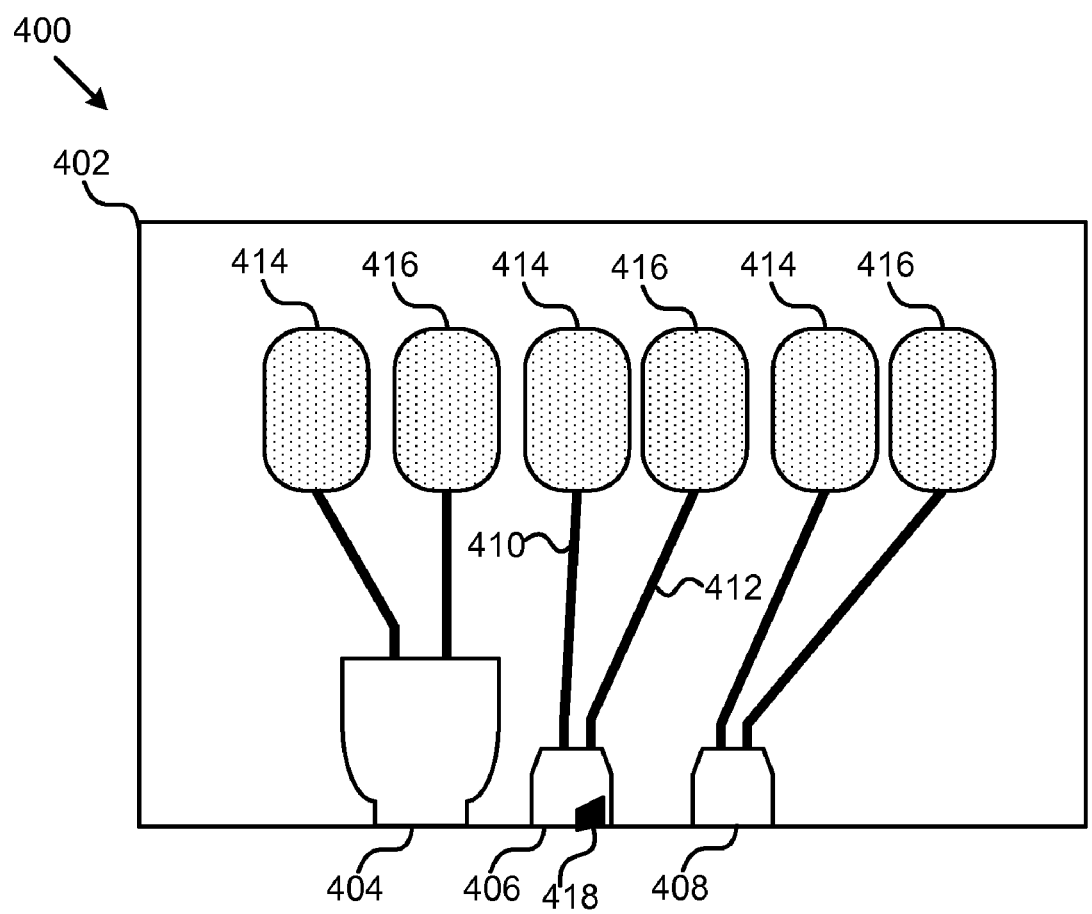
FIG. 4 is a schematic layout diagram illustrating one embodiment of the positioning of MR heads on a head substrate.

FIG. 4 illustrates one embodiment of a MR head chip 400 for a MR head reader/writer device on a head substrate 402. In one embodiment, the chip 400 includes a head substrate 402, one or more writer heads 404, one or more reader heads 406, and one or more servo heads 408. Additionally, the layout 200 may include a plurality of electrical contact pads 414, 416, and a plurality of electrical connections 410, 412.

In one embodiment, the head substrate 402 is common to multiple MR heads 404-408. The head substrate 402 may be a conductive AlTiC wafer. Alternatively, conductive silicon may be used. The head substrate 402 may provide structural support and mounting positions for the heads 404-408. The head substrate may be machined to further define the heads 402-408.

In one configuration, sixteen eight write heads 404, eight read heads 406 and two servo heads 408 are deposited on the head substrate 402. In a certain embodiment, the write heads 404 and the read heads 406 are interleaved, and a servo head 408 is positioned on each end of the row of write/read heads 404, 406. The heads 404-408 may comprise an insulative layer deposited between the head body and the head substrate 402 for electrical isolation. The insulation layer may not provide complete isolation, but still provide a high degree of electrical isolation. In certain embodiments, the electrical resistance through the insulative layer may be about 10 s of MOhms.

In one embodiment, the chip 400 includes electrical contacts 414, 416 and electrical connections 410, 412 between the heads 404-408. A positive connection 410 may be provided to a contact pad 414 designated as a positive contact. A negative, neutral, or ground connection 412 is provided to a negative contact pad 416. A positive connection 410 and a negative connection 412, as well as a positive contact pad 414 and a negative contact pad 416 are provided for each MR head on the chip 400.

In one embodiment, a short 418 may be formed between an MR head 406-408 and the head substrate 402. The short 418 may be the result of tape material or the product of a reaction between the head and tape. In the depicted embodiment, the contaminant come in contact with both the read head 406 or 408 and the head substrate 402 and bridges the electrical gap originally formed by the insulative layer. In such an embodiment, the impedance between the head 406 or 408 and the substrate 402 is reduced significantly. A typical impedance value may be a few kOhms. The formation of the short 418 may render the read head 406 or 408 inoperable, and result in data read errors or failure of the tape drive 106.

Figure 5A:
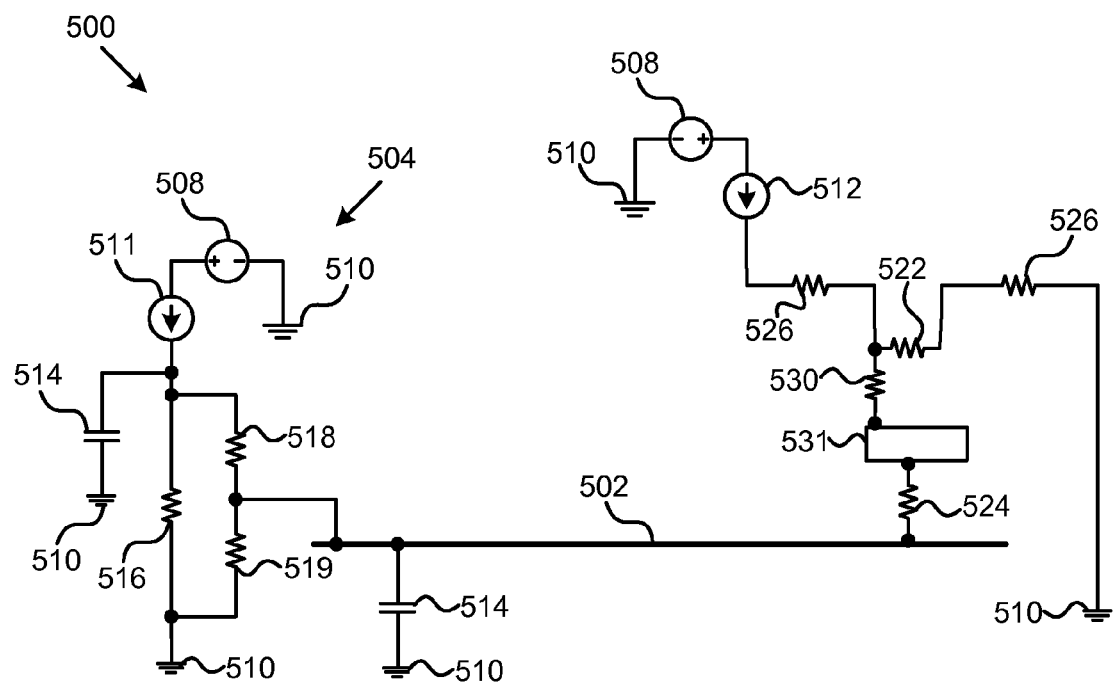
FIG. 5A is a schematic circuit diagram illustrating one embodiment of a biasing circuit for generating a baseline electric potential level between a head substrate and ground.

FIG. 5A illustrates one embodiment of biasing circuits 500 for biasing the MR heads 406-408 and the head substrate 402. The circuits may include the head substrate biasing circuit 504 connected to head substrate 502, and a MR head biasing circuit 506. In certain embodiments, the head biasing module 302 comprises the MR head biasing circuit 506 and the substrate biasing module 304 comprises the substrate biasing circuit 504.

The head substrate biasing circuit 504 may include a DC voltage source 508, a programmable current source 511 and a ground connection 510. Additionally, the head substrate biasing circuit 504 may include one or more bypass capacitors 514 and one or more resistors 516, 518, 519. In one embodiment the head substrate biasing circuit 504 is configured to apply a bias voltage of 1.5 Volts to the head substrate 502. The resistors 516, 518, 519 may be arranged in a voltage divider configuration. For example, the current source 511 may be programmed to supply an 8.57 mA current to the voltage divider circuit. The reference resistor 516 may have a value of 350 Ohms to generate a reference voltage of about 3 Volts. The divider resistors 518, 519 may have a resistance value of 35 kOhms each to evenly divide the voltage. In an alternative embodiment, resistor 519 may have a different resistance than divider resistor 518. In such an embodiment the voltage applied to the head substrate is equivalent to the voltage across resistor 519. That voltage is determined by the source voltage and the ratio of the resistances of divider resistors 518, 519. A lead extending from between the divider resistors 518 and 519 may be connected to the head substrate 502 resulting in a 1.5 Volt bias potential. The bypass capacitors 514 may be configured to filter transient AC signals.

In one embodiment the MR head biasing circuit 506 is configured to substantially ground the MR head. The circuit 506 may include a DC voltage source 508, one or more ground connections 510, a programmable current source 512, the MR head, and multiple resistive elements 526. In one embodiment the MR head has an equivalent resistance 522 of 30-100 Ohms. Modern MR heads are generally provided with magnetic shields 530, which flank both sides of each MR sensor and which are both magnetically permeable alloys of Ni and Iron or Cobalt or other metals. Because these are metallic, they are usually good conductors. As such, the MR sensors must be electrically isolated from the shields 530 via high resistance insulation. The resistor 530 represents this insulation resistance. However, sometimes the shields are electrically connected to the sensor leads to prevent charge build up on the shields, and in this case the resistor 530 is a thin film device built into the head during wafer processing. The resistance value for resistor 530 is typically 25 to 75 kOhms as mandated by its charge bleeding function.

Generally, shorting is observed to occur in the gap between the substrate and the shields. This may not act to substantially reduce substrate voltage because the resistors 530 are effectively in series with resistors 526. However, shorts on multiple sensors may pull the substrate voltage down enough to be detected, as these circuit act in parallel. In addition, additional shorting between the sensor and shields effectively shunts resistor 530 or the insulation resistance when no resistors 530 are used. In this case, substrate shorts in essence connect directly to the sensor through 530. For the remainder of this discussion, it is assumed that shorting is occurs by either or both of these means and is significant enough to cause a detectable change in the substrate resistance. Ideally, the isolation resistance 524 between the MR head and the head substrate 502 has a value of about 10 s of MOhms. The isolation resistance 524 is not an actual resistor component. The isolation resistance 524 is the equivalent path resistance of the insulative layer. If a short 418 occurs between the MR head and the head substrate, isolation resistance 524 may be reduced substantially. In one embodiment, the isolation resistance 524 may be reduced to less than 1 kOhms. In one embodiment, the resistance drop may reduce the potential level between the head substrate 502 and ground 510 to 0.9 Volts. The resistive elements 526 may have low resistance values, resulting in a near ground potential level on the MR head.

Figure 5B:
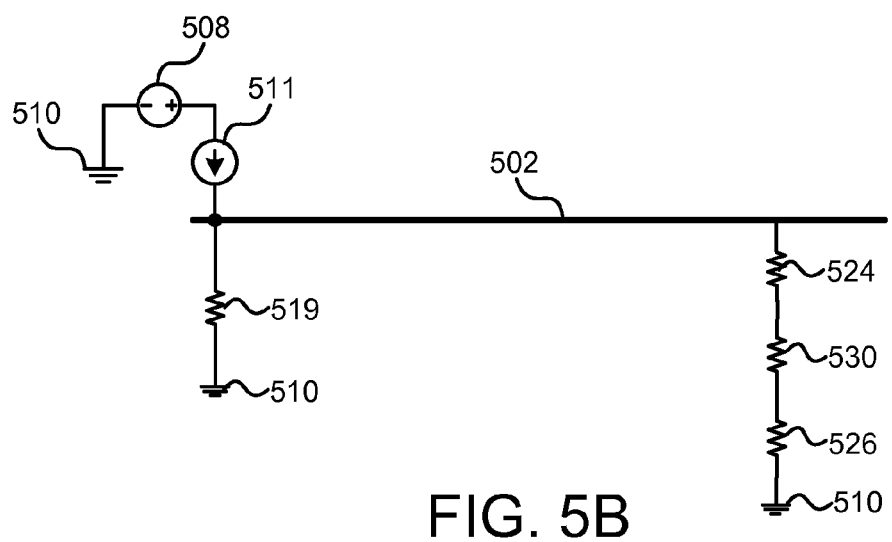
FIG. 5B is a simplified schematic circuit diagram illustrating one embodiment of a biasing circuit for generating a baseline electric potential level between a head substrate and ground.

FIG. 5B is a simplification of the resistance network between the head substrate 502 and ground 510 created by the substrate biasing circuit 504 and the head biasing circuit 506. For simplification, only the resistive elements between the head substrate 502 and ground 510 are shown.

In one embodiment, the substrate voltage reference resistor 519 has a value of 35 kOhms. In such an embodiment, the head biasing resistor 526 has a relatively lower resistance of 130 Ohms. Under normal circumstances, the isolation resistance is about 100 MOhms. In such an embodiment, the resistance between the head substrate 502 and ground through the head biasing circuit 506 is far greater than the resistance to ground through the substrate biasing circuit 504. Under normal operating conditions, the path between the head substrate 502 and ground 510 through the head biasing circuit 506 may be nearly an open circuit, and consequently not significantly affect the head substrate voltage level. However, differences arise when the head substrate 502 is shorted to the MR heads 406-408.

In one embodiment, the presence of a short 418 between the MR head 406-408 and the head substrate 502 may result in a reduction of the isolation resistance 524 to less than 1 kOhms. In such an embodiment, the total resistance on the head biasing circuit 506 path to ground is reduced to about 1 kOhms. Consequently, the total resistance to ground 510 of the head substrate 502, which may be defined as the parallel combination of the substrate voltage reference resistor 519 and the isolation resistance 524 in series with the head biasing resistor 526, is substantially reduced. Consequently, the potential level between the head substrate 502 and ground 510 is noticeably reduced.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
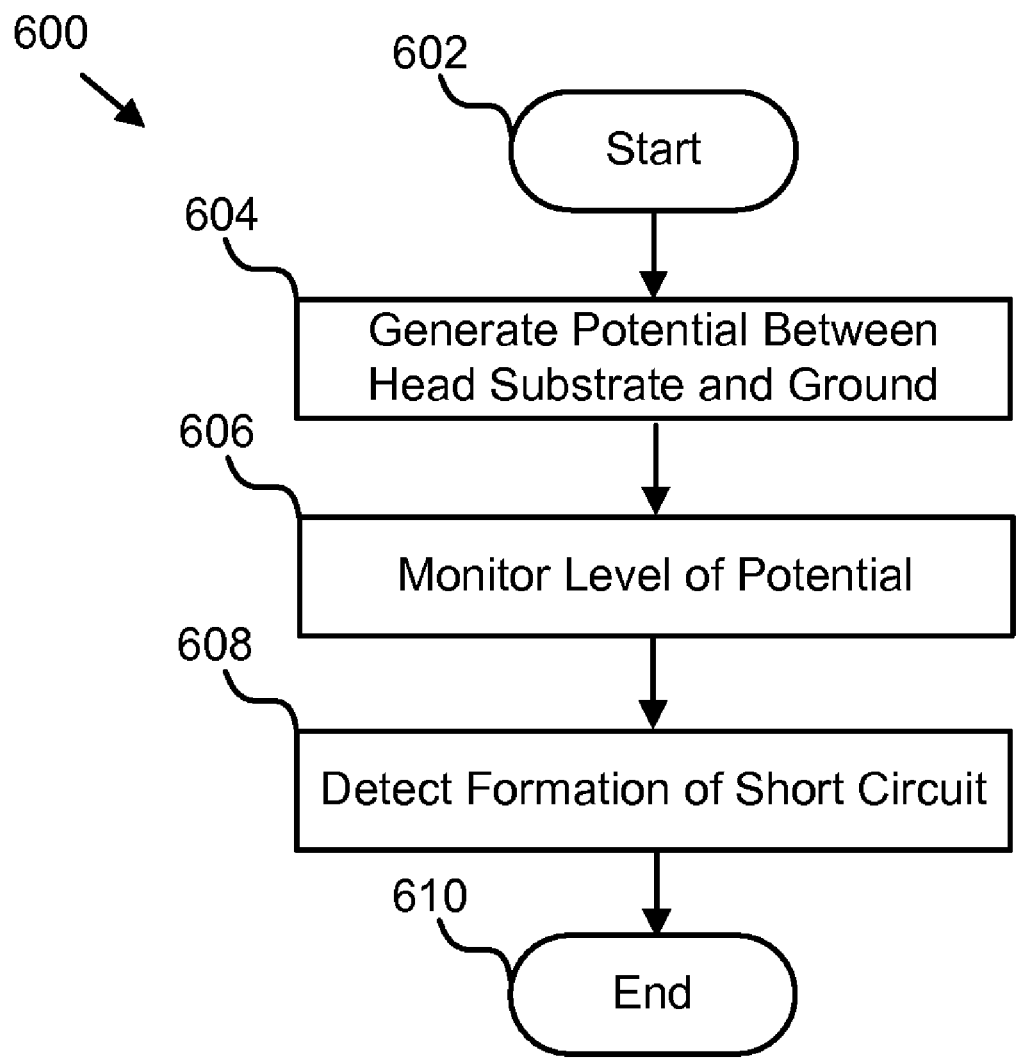
FIG. 6 is a schematic flow chart diagram illustration on embodiment of a method for detecting the formation of a short between a MR head and a head substrate.

FIG. 6 illustrates one embodiment of a method 600 for detecting the formation of a short between a MR head 406-408 and a head substrate 402. In one embodiment, the method starts 602 with generating 604 a baseline electric potential between a head substrate 402 and ground using the biasing module 202. The monitoring module 204 may then monitor 606 the level of the electric potential generated 604 by the biasing module 202. The detection module 206 may then detect 608 the formation of a short circuit between an MR head 406-408 and the head substrate 402 and the method 600 ends. In one embodiment, the detection module 206 detects the formation of a short by comparing the substrate potential level monitored 606 by the monitoring module 204 to a predetermined threshold value.

Figure 7:
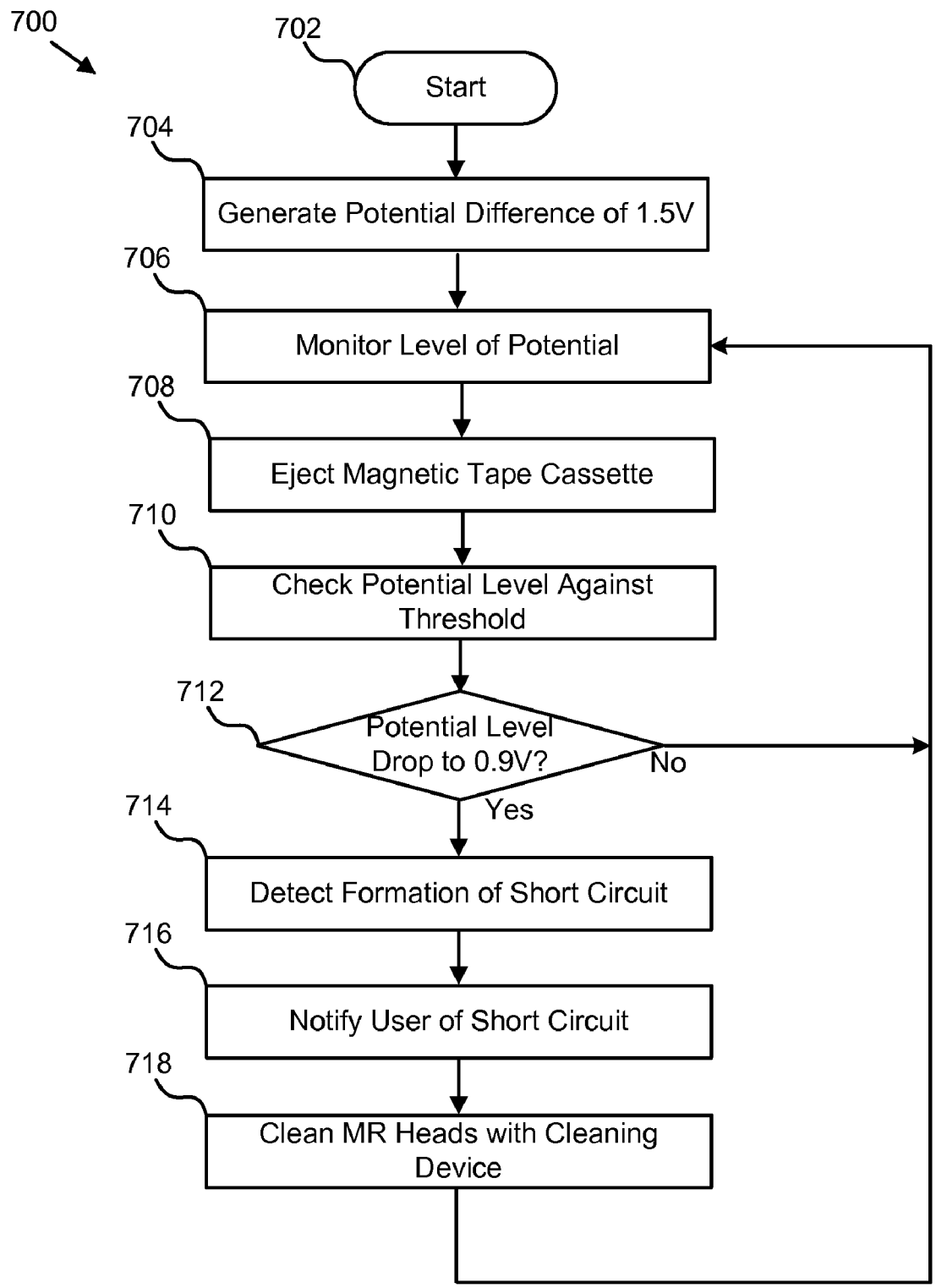
FIG. 7 is a detailed schematic flow chart diagram illustrating one embodiment of a method for detecting the formation of a short between a MR head and a head substrate.

FIG. 7 illustrates a further embodiment of a method 700 for detecting the formation of a short between a MR head 406-408 and a head substrate 402. In one embodiment, the method 700 starts 702 when the biasing module 202 generates 704 an electric potential of 1.5 Volts between a head substrate 502 and ground 510. The monitoring module 204 may then monitor 706 the level of the electric potential. When a magnetic tape cassette 108 is ejected 708 from the magnetic tape drive 106, the detection module 206 may check 710 the level of the electric potential.

If the level of the electric potential has dropped 712 to about 0.9 Volts, the detection module 206 may detect 714 the formation of a short circuit 418 between one of the MR heads 406-408 and the head substrate 402. The notification module 308 may then notify 716 a user of the presence of a short circuit 418. If the potential level did not drop to around 0.9 Volts, the monitoring module 204 may continue to monitor 706 the level of the potential difference.

In one embodiment, a user may insert a head cleaning device 110 and clean 718 the MR heads 406-408 in response to a displayed error message. Alternatively, the cleaning module 306 may manage an automated cleaning 718 of the MR heads 406-408. When the MR heads 406-408 have been cleaned 718, the monitoring module 204 continues to monitor 706 the potential level, and a new magnetic tape cassette 108 may be inserted into the magnetic tape drive 106.

The disclosed embodiments of the apparatus 200, 300, system 100, and method 600, 700 for detecting formation of a short between an MR head 406-408 and a head substrate 402 provide the necessary benefits of early detection and correction of shorts between an MR head 406-408 and the head substrate 402. Consequently, time and system resources are saved while providing greater data reliability.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detecting the formation of a short between a magnetoresistive ("MR") head and a head substrate, the apparatus comprising:
    a biasing module configured to generate a baseline electric potential level between a head substrate of the MR head and ground, the MR head comprising the head substrate and one or more of writer head elements, reader head elements, and servo head elements;
    a monitoring module configured to monitor the level of the electric potential between the head substrate and ground; and
    a detection module configured to detect the formation of a short circuit between one or more of the writer head elements, reader head elements, and servo head elements and the head substrate by detecting a change in the electric potential level monitored by the monitoring module from the baseline level to a predetermined threshold level.

2. The apparatus of claim 1, wherein the biasing module further comprises a substrate biasing module and a head biasing module, wherein the substrate biasing module has a high equivalent resistance with respect to the head biasing module.

3. The apparatus of claim 2, wherein the substrate biasing module comprises a voltage divider circuit configured to generate a predetermined baseline electric potential level using a substrate voltage reference resistor.

4. The apparatus of claim 3, wherein the head substrate to ground resistance characterized by a short between the head substrate and one or more of the writer head elements, reader head elements, and servo head elements in series with a low resistance head biasing module in parallel combination with the substrate voltage reference resistor is lower than the substrate voltage reference resistor's actual resistance to ground.

5. The apparatus of claim 1, wherein the detection module is further configured to detect a short circuit between one or more of the writer head elements, reader head elements, and servo head elements and the head substrate by detecting a change in electric potential level between the head substrate and ground resulting from a change in resistance between the head substrate and ground.

6. The apparatus of claim 1, wherein the detection module checks the electric potential level monitored by the monitoring module when a tape cassette is ejected.

7. The apparatus of claim 1, further comprising a cleaning module configured to manage head cleaning in response to the detection module detecting a short circuit.

8. The apparatus of claim 1, further comprising a notification module configured to notify a tape drive user when a short circuit is detected.

9. A system for detecting the formation of a short between a magnetoresistive ("MR") head and a head substrate, the system comprising:
    a magnetic tape cassette configured to store data on a magnetic tape;
    a magnetic tape drive configured to:
        generate a baseline electric potential level between a head substrate of the MR head and ground, the MR head comprising the head substrate and one or more of writer head elements, reader head elements, and servo head elements;
        monitor the level of the electric potential between the head substrate and ground; and
        detect the formation of a short circuit between one or more of the writer head elements, reader head elements, and servo head elements and the head substrate by detecting a change in the electric potential level monitored by the monitoring module from the baseline level to a predetermined threshold level; and
    a head cleaning device configured to clean the MR head and head substrate on the magnetic tape drive.

10. The system of claim 9, wherein the head substrate to ground resistance characterized by a short between the head substrate and the MR head in series with a low resistance head biasing module in parallel combination with the substrate voltage reference resistor is lower than the substrate voltage reference resistor's actual resistance to ground.

11. The system of claim 9, wherein the magnetic tape drive is further configured to detect a short circuit between one or more of the writer head elements, reader head elements, and servo head elements and the head substrate by detecting a change in electric potential level between the head substrate and ground resulting from a change in resistance between the head substrate and ground.

12. The system of claim 9, wherein the magnetic tape drive is further configured to manage head cleaning with the head cleaning device in response to detecting a short circuit between one or more of the writer head elements, reader head elements, and servo head elements and the head substrate.

13. The system of claim 12, wherein the MR heads on the magnetic tape drive are automatically cleaned with the head cleaning device in response to detection of a short circuit between the MR head and the head substrate.

14. The system of claim 9, wherein the magnetic tape drive is further configured to notify a tape drive user to load the head cleaning device when a short circuit is detected.

15. A signal bearing medium tangibly embodying a program of machine-readable instructions executable by a digital processing apparatus to perform an operation for detecting the formation of a short between a magnetoresistive ("MR") head and a head substrate, the operation comprising:
    generating a baseline electric potential level between a head substrate of the MR head and ground, the MR head comprising the head substrate and one or more of writer head elements, reader head elements, and servo head elements;
    monitoring the level of the electric potential between the head substrate and ground; and
    detecting the formation of a short circuit between one or more of the writer head elements, reader head elements, and servo head elements and the head substrate by detecting a change in the electric potential level monitored by the monitoring module from the baseline level to a predetermined threshold level.

16. The signal bearing medium of claim 15, wherein generating further comprises generating an electric potential of about 1.5 Volts between the head substrate and ground.

17. The signal bearing medium of claim 15, wherein detecting further comprises checking the electric potential between the head substrate and ground when a tape cassette is ejected.

18. The signal bearing medium of claim 15, further comprising managing head cleaning in response to detecting a short circuit.

19. The signal bearing medium of claim 15, further configured to notify a tape drive user to load the head cleaning device when a short circuit is detected.

20. A method for detecting the formation of a short between a magnetoresistive ("MR") head and a head substrate, the method comprising:

generating a baseline electric potential level between a head substrate of the MR head and ground, the MR head comprising the head substrate and one or more of writer head elements, reader head elements, and servo head elements;

monitoring the level of the electric potential between the head substrate and ground; and detecting the formation of a short circuit between one or more of the writer head elements, reader head elements, and servo head elements and the head substrate by detecting a change in the electric potential level monitored by the monitoring module from the baseline level to a predetermined threshold level.

* * * * *